United States Patent [19]
Maschhoff

[11] Patent Number: 6,073,623
[45] Date of Patent: Jun. 13, 2000

[54] GRILL LIGHT

[75] Inventor: Lloyd Maschhoff, Belleville, Ill.

[73] Assignee: Empire Comfort Systems, Belleville, Ill.

[21] Appl. No.: 09/103,926

[22] Filed: Jun. 24, 1998

[51] Int. Cl.[7] .............................. A47J 37/00; F24B 3/00; F21V 33/00; F27D 21/02

[52] U.S. Cl. ...................... 126/25 R; 126/213; 362/92; 362/418

[58] Field of Search ................. 126/25 R, 213, 126/39 BA, 41 R, 58; 362/92, 372, 93, 94, 418, 154, 155, 156, 157, 190, 191, 208

[56] References Cited

U.S. PATENT DOCUMENTS

| | | | |
|---|---|---|---|
| 2,278,734 | 4/1942 | Perry | 126/213 |
| 2,414,485 | 1/1947 | Reichart | 362/92 |
| 2,644,882 | 7/1953 | Voda | 362/94 |
| 2,711,475 | 6/1955 | Chadwick et al. | 362/92 |
| 2,809,282 | 10/1957 | Cripe et al. | 126/213 |
| 3,291,114 | 12/1966 | Metcalf | 126/25 R |
| 3,524,980 | 8/1970 | Meloan | 126/41 R |
| 3,992,618 | 11/1976 | Matthews et al. | |
| 5,257,169 | 10/1993 | Walendziak | 362/92 |
| 5,664,875 | 9/1997 | Hegedus | 362/92 |
| 5,676,045 | 10/1997 | Faraj | 126/25 R |

*Primary Examiner*—Ira S. Lazarus
*Assistant Examiner*—Josiah Cocks
*Attorney, Agent, or Firm*—Howell & Haferkamp, LC

[57] ABSTRACT

A barbecue grill having a cooking surface and a retractable light mounted to an upper portion of the lower grill housing and moveable between a first operable position and a second stored position. In the operable position the light is oriented to illuminate the cooking surface of the grill. In the stored position, the top surface of the light is substantially aligned with the cooking surface and the top surface of an auxiliary shelf attached to the grill. The light may also be supplied separately for retrofit on any existing grill.

18 Claims, 3 Drawing Sheets

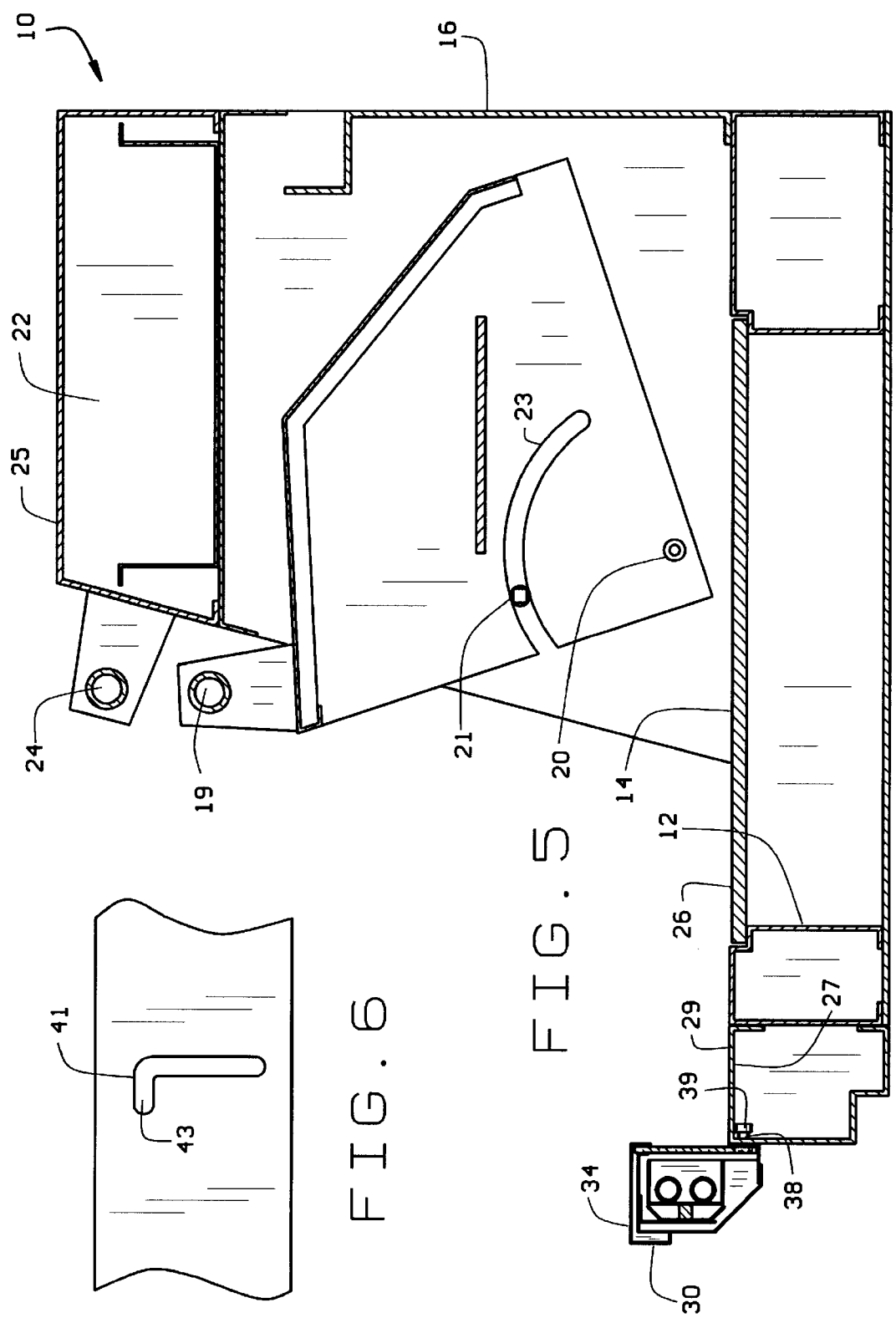

GRILL LIGHT

BACKGROUND OF THE INVENTION

This invention relates to a light for illuminating a cooking surface of barbecue grills in general, and specifically to the construction of a barbecue grill with a light to illuminate the cooking surface of the grill.

Various types of lights have been proposed to illuminate the cooking surface of a barbecue grill. The barbecue grill lights of the prior art, however, are ill-equipped to survive the rigors of the barbecue experience for an extended period of time.

For example, U.S. Pat. Nos. 3,992,618 and 5,664,875 disclose gooseneck type lights that fasten either to a grill housing itself, or to an auxiliary shelf located adjacent the grill housing. The gooseneck lights, however, tend to interfere with the grill lid or the use of the auxiliary shelf, respectively. The gooseneck lights are adjustably positionable to shine down over the grill cooking surface, often putting the lights directly in the path of the smoke emanating from the grill. Thus, the gooseneck lights quickly become clouded by a greasy residue, and are likely to be inadvertently broken by a collision with the lid of the barbecue grill. Also, if one wants to cover the grill after use, the gooseneck type of light is generally incompatible with grill covers. Finally, the use of gooseneck lights is cumbersome for grills that include rotisseries, steamers and/or other cooking accessories that are elevated from the cooking surface, as the lights either interfere with the use of the accessories or the accessories cast shadows on the cooking surface as the light shines over them.

Another prior art barbecue grill light is disclosed in U.S. Pat. No. 5,257,169. This light attaches to the grill lid and shines down upon the grill when the grill lid is in its open position. While this light may be compatible with a grill cover, and while it may avoid interference with the grill lid or auxiliary shelves of a grill, it remains in the direct path of the hot, greasy smoke rising from the grill. Also, the location of the light directly above the grill subjects it to great heat, which undoubtedly shortens bulb life. Finally, this type of light is subject to appreciable vibrational forces as the grill lid is carelessly dropped, or even slammed shut, as all too often occurs with barbecue grills.

Therefore, the barbecue grill lights of the prior art interfere with the workability of the grill or the useability of the area around it, and have shortened lifespans because of their position in the path of the smoke rising from grills in use and because of their position relative to the grill lid.

SUMMARY OF THE INVENTION

Among the several advantages of the present invention may be noted the provision of a light for a barbecue grill having a relatively longer lifespan than the lights of the prior art; the provision of a retractable light for a wide variety of barbecue grills; the provision of a retractable light for a barbecue grill that conveniently stores away when it is not in use; the provision of a light for a barbecue grill that enhances the workable area around the grill; and the provision of a light for a barbecue grill that substantially avoids the smoke and heat of the grill when the light is in use.

Generally the present invention comprises a barbecue grill having a cooking surface and a retractable light, or a light which may be separately provided for retrofit on an existing barbecue grill. The retractable light is selectively positionable between a first operable position where the light is oriented to illuminate the cooking surface and a second stored position. The light is attached to the front of the lower housing of a grill, and is slidably positionable between the operable position and the stored position. In the operable position, the light locks into place and is oriented to illuminate the cooking surface from the front of the grill cooking surface toward the back of the cooking surface once a switch is operated. In the stored position, the top surface of the housing of the light forms a shelf that is substantially aligned with an auxiliary shelf attached to the front of the grill.

The grill light of the present invention generally comprises an elongated housing in which is mounted one or more light bulbs, preferably two florescent bulbs, with the housing and bulbs extending substantially the entirety of the length of the cooking surface of the grill. A mechanical linkage is provided for connecting between the light housing and the generally vertical front surface of the lower half of the grill. Preferably, this mechanical linkage may be formed from a pair of slots cut in the grill housing, one at or near either end of the light housing, and pins mounted to the light housing and adapted to be received in the slots so as to guide the movement of the light in a generally vertical direction as it is moved between its retracted and operable positions. The shape of the slot may be adapted to provide a "land" for the light in its operable position which is generally elevated above the stored position. The pins may have knobs or other mechanical structure which serves to capture the pin within the slot and prevent the light from becoming inadvertently separated from the grill housing. The light may be conveniently operated with a simple electrical snap switch which may be mounted so that its spring loaded plunger is actuated as the light is moved between its stored and operable positions and vice versa. Thus, the grill light may automatically be actuated and turned off without any affirmative action on behalf of the grill operator. Alternatively, a separate electrical switch may be provided to allow the operator to selectively operate the light independently of its mechanical position with respect to the cooking surface. However, this is perhaps not as desirable as the light may inadvertently be left on after it is moved to the stored position, thereby resulting in a reduced or shortened bulb life.

As mentioned above, the grill light of the present invention may be conveniently provided as part of a barbecue grill. Alternatively, the grill light may be separately provided for mounting to an existing barbecue grill. In that instance, it may be convenient to reverse the arrangement of the mechanical linkage mounting the grill light to the grill. In that regard, slots may thus be provided in the grill light housing along with pins adapted for mounting to the barbecue grill. With this alterative, mounting of the grill light to the barbecue grill may be less difficult in that slots need not be cut into the lower grill housing and instead pins may be conveniently mounted such as by drilling appropriate holes, etc. as would be apparent to one of ordinary skill in the art.

Other objects and features of the invention will be in part apparent and in part pointed out hereinafter.

BRIEF DESCRIPTION OF THE DRAWINGS

FIG. 5 is a cross-sectional view taken along the plane of line 5—5 in FIG. 2 detailing the grill and light in the operable position.

FIG. 6 is a partial view of one of the slots for mounting the light to the grill.

DESCRIPTION OF THE PREFERRED EMBODIMENT

Figure 1:
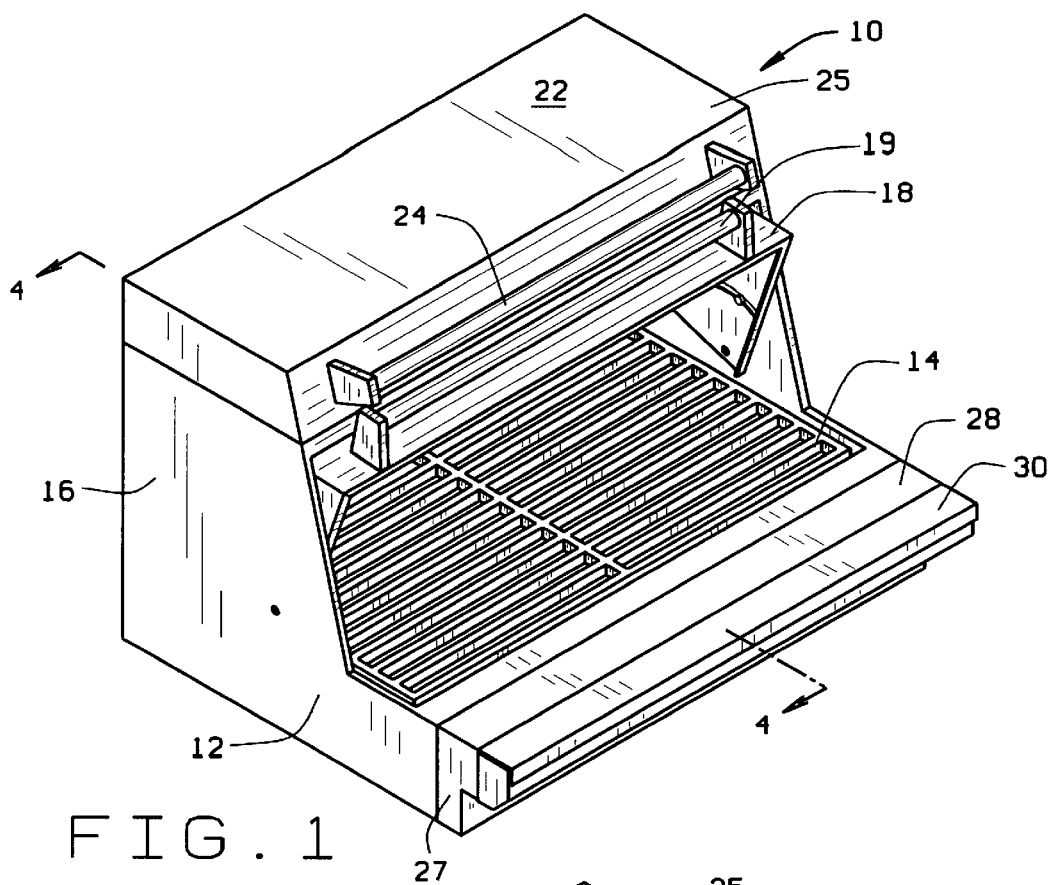
FIG. 1 is a perspective view of the grill of the present invention with the light in the stored position.

Referring now to the drawings, a portion of a grill of the present invention is indicated generally by the reference numeral 10. For illustrative purposes, the invention will be described in the context of an outdoor barbecue grill. It is to be understood, however, that the invention is equally well suited for grills intended to be used indoors, as are becoming increasingly more common.

The barbecue grill of the present invention has a lower housing 12 configured for cooking and heating food. The grill housing is attached to a stand (not shown) to raise the grill to an acceptable level for the cooking of food. As is well understood in the art, the structure of grill stands varies considerably depending on many factors not important here.

The lower housing 12, or the grill pit, may be configured with a burner for gas heating, an electric burner for electric heating, or the lower housing of the grill may configured for heating by a charcoal fire or other heat sources well known in the art. In the case of gas or electric grills, burner controls (not shown) are often mounted on the lower grill housing 12. Optionally, an ignitor may also be incorporated. While the lower portion 12 shown in the figures herein is relatively shallow in depth, it is to be understood that it is typically relatively deep in order to accommodate the heat generating and retaining components found in conventional grills.

The lower housing 12 of the grill includes a cooking surface 14 therein located over the heat generating and maintaining components. The cooking surface may be of many types well known in the art, such as a conventional grill rack or grill plate, or a combination of these types. Additionally, sear plates or specialized surfaces may be employed in the cooking surface.

The grill also has an upper housing 16 which includes a lid 18 with a handle 19 that allows access to the cooking surface 14. In the particular embodiment shown in the figures, the lid 18 is a separate structure from the upper housing 16. The lid 18 rotates open and closed upon a hinge 20 within the upper housing 16 in cooperation with the support 21 and the curved groove or slot 23 formed into the lid. In other types of grills the lid and the upper housing may be integral and rotate relative to the lower portion of the grill via a hinge located near the back of the lower portion of the grill. In still other types of grills, the entire lid or upper shell may lifted entirely off the grill. The present invention is largely unaffected by the type of upper housing 16 or lid enclosure 18 employed, as will become apparent below.

The upper housing 16 of the grill may contain grill accessories, such as a steamer 22, which has a handle 24 and lid 25 of its own. The upper housing may also contain a rotisserie or other cooking elements well known in the art. The presence of these cooking accessories in no way affects the performance of the present invention, and discussion is made of them only to demonstrate their compatibility with the light of the present invention.

The cooking surface 14 has a front portion 26 and a rear portion 28 that correspond to the front and rear portions of the grill. Preferably, attached to the front of the lower grill housing is an auxiliary shelf 27 having a top surface 29 in substantial alignment with (i.e. substantially level to) the cooking surface 14. It is to be understood that the auxiliary shelf, or similar shelves, could be mounted on the remaining sides of the grill. Preferably, the auxiliary shelf 27 is made of a material that is a poor heat conductor to reduce the risk of burns during use of the grill, and to minimize the heat conducted to the retractable light 30.

Figures 3, 4:
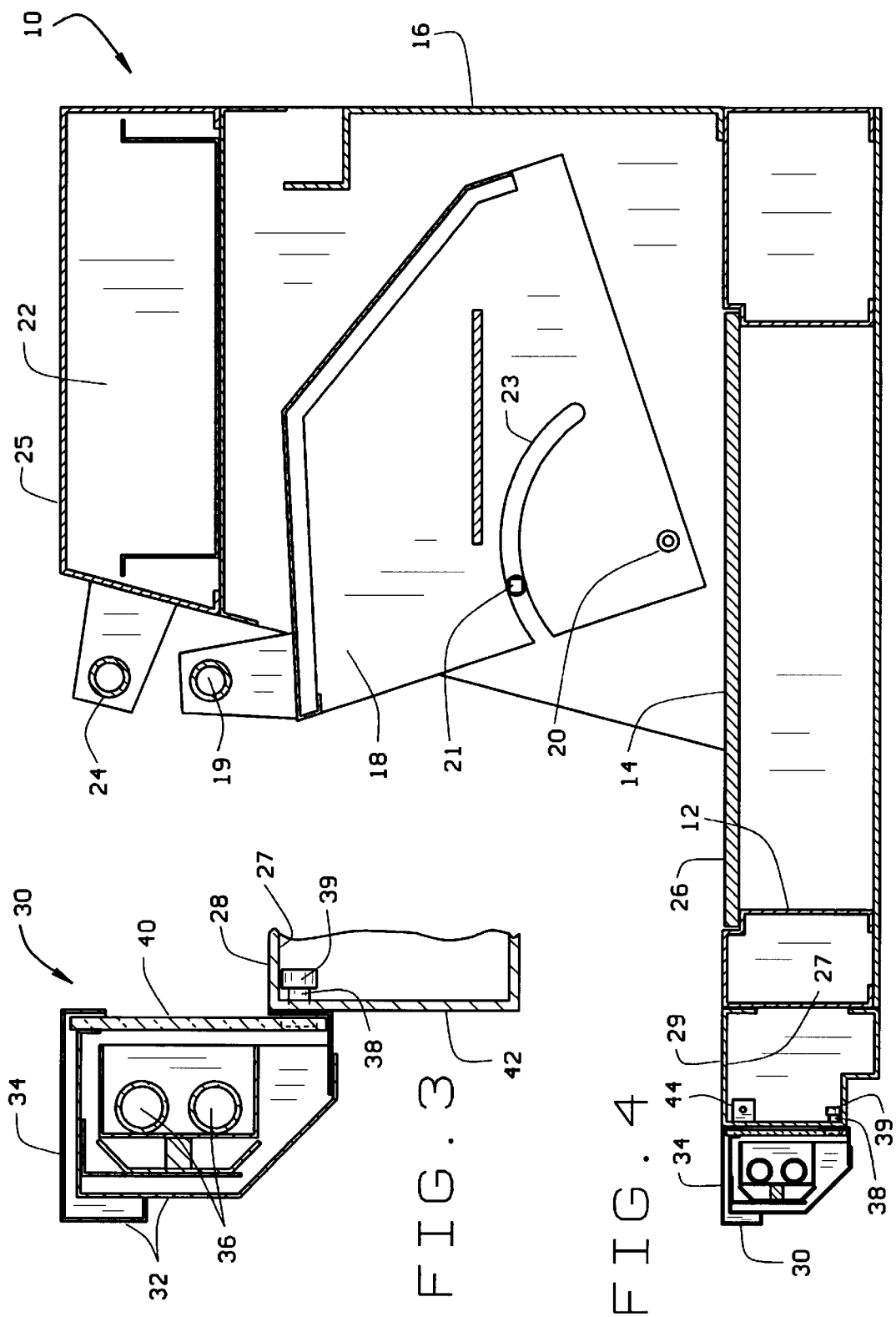
FIG. 3. is a cross-sectional view of the light elevated in its operable position.
FIG. 4 is a cross-sectional view taken along the plane of line 4—4 in FIG. 1 detailing the grill and light in the stored position.

The retractable light 30 of the present invention is mounted to the auxiliary shelf. As is best seen in FIG. 3, the light 30 comprises a housing 32 with a top surface 34. The housing 30 contains a light source 36. Preferably, the light source is comprised of two generally parallel elongated florescent light bulbs as shown, but the light source may alternatively consist of one or more bulbs of any shape, or any other light source that is known in the art. The surface area of the light housing 30 immediately surrounding the light source 36 may be coated with a reflective material to further enhance the illumination provided by the light source 36. A transparent sheet 40, such as a piece of glass or plastic, encloses the light source 36 within the light housing 32 and protects the light source from contamination and accidental breakage.

Figure 2:
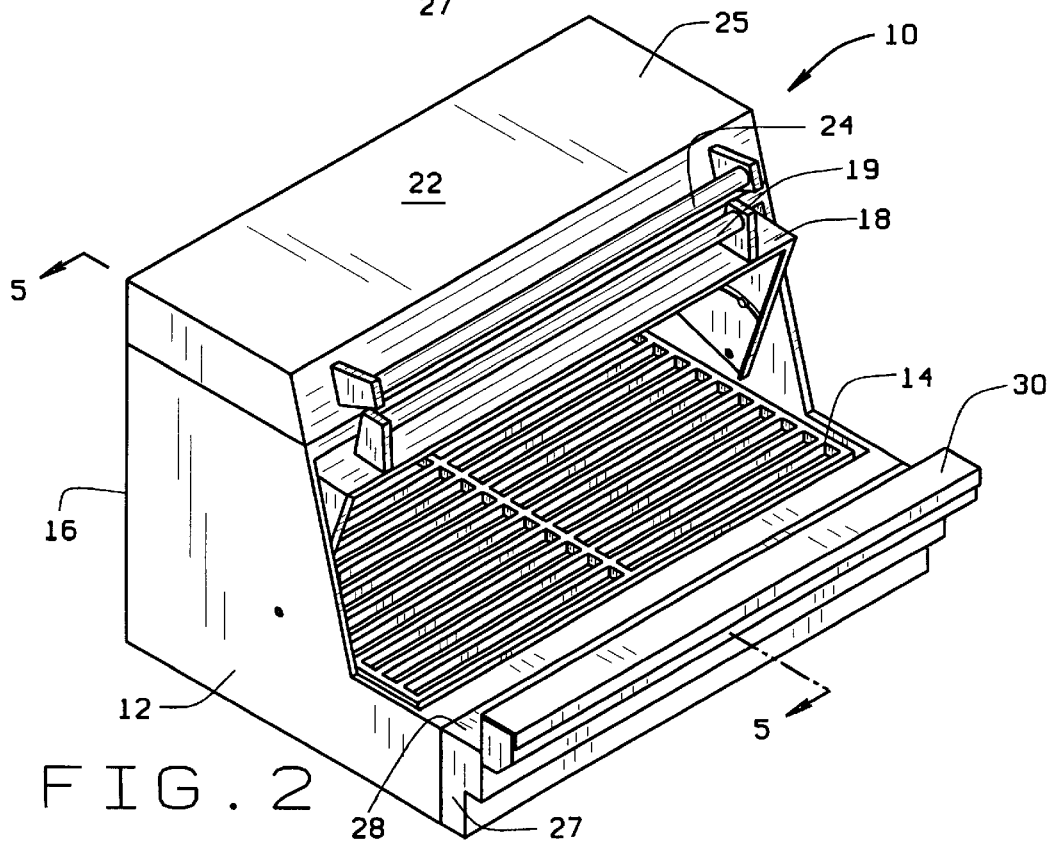
FIG. 2 is a perspective view of the grill of the present invention with the light in the operable position.

The light 30 is slidably mounted to the auxiliary shelf 27 preferably via a pair of pins 38 and corresponding slots 41 in the front side 42 of the auxiliary shelf. Hence, the pins and slots allow for selectable positioning of the light between a first, or operating, position (FIGS. 2, 3, and 5) and a second, or stored, position (FIGS. 1 and 4). The pins 38 may have an enlarged shoulder 39 so as to be conveniently retained within the slots, or any other convenient mechanical structures may suffice as well. The slots 41 may be shaped with an upper "land" 43 so that as the light 30 is moved to its operable position, the light 30 may be self supporting as the pins 38 rest on the lands 43. These two positions comprise the two chief locations of the light.

The light is engageably lockable into the operable position. The locking configuration could be accomplished in a number of ways well known in the art, including but not limited to spring loaded pins and detents, or geometric configurations of the slots in the front side 42 of the auxiliary shelf 27 to ensure that the pins 38 stay in a specified location relative to the grill cooking surface 14. For example, the slots could be generally vertical with a small horizontal portion or notch near their top to hold the light in place. This is exemplified in the preferred embodiment depicted in FIG. 6. Moreover, several notches could be used or several detents cooperating with a spring loaded pin to lock the light in position at various heights relative to the cooking surface. Also, an automatic switch 44 could be incorporated into the locking engagement to close a circuit and energize the light when moved into the operable position, and to de-engergize the light when moved into the stored position. As shown in FIG. 4, the switch 44 is mounted to the interior of shelf 27 and is arranged to be actuated as the light 30 is moved with pins 38 resting on lands 43. Alternatively, a manual switch could be employed to energize and de-energize the light. It should be recognized that multiple pins 38 and locking arrangements are preferred along the length of the light 30.

When the light is in the first or operable position and energized, it illuminates the cooking surface 14 from the front portion of the cooking surface 26 toward the back portion 28. Because the retractable light extends substantially along the entire front side of the cooking surface, the cooking surface is illuminated more evenly than with other types of lights. Additionally, the light source 36 could be configured to customize the illumination of grill accessories, such as a rotisserie or steamer, by orienting a portion of the light source 36 or the reflective material surrounding the light source at an angle relative to the cooking surface.

The position of the retractable light of the present invention relative to the cooking surface is particularly advantageous. Because the light is positioned sidelong the grill, it largely avoids the smoke and heat that plagues the barbecue grill lights of the prior art while at the same time being sufficiently elevated to illuminate food at the back of the grill even when taller foods such as a thick steak are positioned at the front of the grill. The sidelong position of the light relative to the grill also avoids interference with the handles 18, 24 of the upper housing 16 of the grill, and clears the area above the grill for the cook to maneuver. Finally, the sidelong position of the light reduces the likelihood of inadvertent bumping of the light as the grill is used, and transparent sheet 40 further protects the light source from accidental damage.

When the light is in the second or stored position, the top surface 34 of the housing 32 of the retractable light 30 is substantially aligned with the top surface 28 of the auxiliary shelf 27. Hence the light is retracted into the stored position so that the light is fully protected against accidental collision, and the top surface 34 of the light, together with the top surface 28 of the auxiliary shelf 27, provide an enhanced work surface in front of the grill. The auxiliary shelf could perhaps be omitted and the light 30 could be attached directly to the lower grill housing 12, but the auxiliary shelf is preferred to both increase the working area immediately in front of the cooking surface 14 and to distance the light somewhat from the heat, smoke, and grease generated on the cooking surface in use.

Likewise, the auxiliary shelf 27 could be attached to the grill elsewhere other than to the front of the grill. Nonetheless, the front is the preferred position of the light as the sides of the grill are typically already equipped with convenient shelves, handles, or accessories on either side of the grill. While the front position is preferred, it is also appreciated that multiple lights of the present invention could be used simultaneously on a grill, whether on the same side or different sides of the cooking surface.

In operation, the invention works as follows. The retractable light 30 is lifted from the stored position into the operable position. The light 30 is locked into the operable position, and a switch 44 is activated to energize the light source. Once the light source is energized, the light 30 illuminates the cooking surface. When the light is no longer needed, the switch 44 is de-activated and the light is de-energized, and the light is unlocked and returned to the stored position.

While the present invention has been described by reference to a specific embodiment, it should be understood that modifications and variations as would be apparent to one of ordinary skill in the art are within the scope of the invention which is limited solely by the claims and their equivalents.

What is claimed is:

1. A barbecue grill having a cooking surface, an auxiliary shelf, and a retractable light, said retractable light being selectively positionable between a first operable position and a second stored non-operable position, said light being oriented to illuminate the cooking surface from the first operable position, said auxiliary shelf secured thereto and wherein a top surface of said retractable light is substantially aligned with a top surface of said shelf as said retractable light is in its second position, said retractable light being attached to a front portion of a lower shell of said barbecue grill.

2. The barbecue grill of claim 1 wherein said retractable light is mechanically lockable into said first operable position.

3. The barbecue grill of claim 2 wherein said light extends along substantially the entirety of the length of the cooking surface to thereby illuminate substantially the entirety of the cooking surface.

4. The barbecue grill of claim 3 wherein said light has an elongated light source oriented to be substantially parallel to the front of the cooking surface, and wherein said light source is covered from view as the light resides in its second stored position.

5. The barbecue grill of claim 4 wherein said light follows a generally vertical path as it is moved between its first and second positions.

6. The barbecue grill of claim 5 further comprising a mechanical linkage between said light and said grill to control the movement between said light and said grill as it is moved between its first and second positions.

7. The barbecue grill of claim 6 wherein said mechanical linkage comprises at least one pair of pins and slots.

8. The barbecue grill of claim 7 further comprising a switch configured to be automatically operated as said light is moved between its first and second positions, and vice versa.

9. The barbecue grill of claim 1 further comprising a transparent sheet located between a light source of said retractable light and said cooking surface.

10. The barbecue grill of claim 1 further comprising a switch being configured to energize said retractable light when said light is in said first operable position.

11. A barbecue grill having a cooking surface, an auxiliary shelf, and a light, said light illuminating the cooking surface sidelong in a first chief position, and said light being stowed substantially adjacent the cooking surface in a second chief position, said auxiliary shelf attached to said grill and wherein a top surface of said light is substantially aligned with a top surface of said shelf as said light is in said second chief position, said light being attached to a front portion of a lower shell of said grill.

12. The barbecue grill of claim 11 further comprising a switch configured to energize the light in the first chief position.

13. The barbecue grill of claim 11 further comprising a transparent sheet positioned between said light and said cooking surface.

14. The barbecue grill of claim 11 wherein said light is lockably engageable in the first chief position.

15. A light for illuminating a cooking surface of a barbecue grill, said light comprising a generally elongated light source mounted in a generally elongated housing, and a mechanical linkage for attaching said light housing to an upper edge of a front portion of a lower shell of said barbecue grill so that when mounted it may be conveniently moved between a first operable position and a second stored position wherein said light is adapted to illuminate the cooking surface from the first operable position.

16. The light of claim 15 further comprising a switch for energizing said light in its first operable position.

17. The light of claim 16 wherein said mechanical linkage is adapted to permit said light to be fixed in each of its two positions when it is mounted to said grill.

18. The light of claim 17 wherein said light housing is substantially flat so that it is substantially aligned with a flat surface adjacent to the cooking surface as it resides in its second stored position.

* * * * *